United States Patent [19]

Sugiyama et al.

[11] Patent Number: 4,513,489
[45] Date of Patent: Apr. 30, 1985

[54] PROCESS FOR MANUFACTURING A HOSE MOUTHPIECE

[75] Inventors: Kenji Sugiyama, Gifu; Takeshi Miyazaki, Aichi, both of Japan

[73] Assignee: Toyoda Gosei Co., Ltd., Nishikasugai, Japan

[21] Appl. No.: 482,282

[22] Filed: Apr. 5, 1983

[30] Foreign Application Priority Data

Apr. 6, 1982 [JP] Japan .................. 57-57550

[51] Int. Cl.³ .................. B21D 39/00; B23P 11/00
[52] U.S. Cl. .................. 29/520; 29/525; 285/256
[58] Field of Search .............. 29/523, 512, 525, 520, 29/506, 507, 508; 285/256, 258

[56] References Cited

U.S. PATENT DOCUMENTS

| 1,725,286 | 8/1929 | Loughead | 285/258 |
|---|---|---|---|
| 1,944,890 | 1/1934 | Heidloff | 285/256 |
| 1,951,860 | 3/1934 | Cowles | 285/256 X |
| 2,525,616 | 10/1950 | Peeps | 285/256 X |
| 2,926,029 | 2/1960 | St. Clair et al. | 285/256 |
| 3,433,505 | 3/1969 | Weatherhead | 285/256 X |
| 3,525,542 | 8/1970 | Belart et al. | 29/520 X |

Primary Examiner—Charlie T. Moon
Attorney, Agent, or Firm—Cushman, Darby & Cushman

[57] ABSTRACT

A process for manufacturing a hose mouthpiece by joining a nipple having a radially outwardly spread end to a mouthpiece body having an axial nipple holding hole. The nipple is inserted into the hole in the body until its spread end abuts on a seat surface encircling one end of the hole. The spread end is press formed against the seat surface so that it may become flush with the seat surface, and a seat surface encircling the other end of the hole to define a seat for one end of a hose is caulked about the nipple projecting outwardly from the other end of the hole, whereby the nipple is secured to the mouthpiece body. The process is suitable for making, for example, a mouthpiece for a brake hose, and inexpensive, since it does not include welding or brazing.

2 Claims, 3 Drawing Figures

PROCESS FOR MANUFACTURING A HOSE MOUTHPIECE

BACKGROUND OF THE INVENTION

1. Field of the Invention

This invention relates to a process for manufacturing a hose mouthpiece, such as for a brake hose, by joining a mouthpiece body and a nipple together.

2. Description of the Prior Art

A hose mouthpiece, such as for a brake hose, has hitherto been manufactured by cutting, for example, a steel bar having a predetermined length into a shape having a nipple 1 to which a hose is connected, a female screw thread 2 by which the mouthpiece is connected to a nozzle member, and a seat 3 for the nozzle member, as shown in FIG. 1. This method, however, requires a lot of time and labor because of, for example, the complications involved in the formation of the nipple. Various methods have, therefore, been proposed to overcome those disadvantages. According to these methods, a mouthpiece body having a nipple holding hole and a nipple are prepared separately from each other, and the nipple is inserted into the nipple holding hole, and secured to the mouthpiece body by welding or brazing or otherwise. These methods, however, require an expensive welding or brazing apparatus, and a lot of time and labor for the welding or brazing job.

SUMMARY OF THE INVENTION

This invention provides a simple process which makes it possible to manufacture hose mouthpieces at a low cost without requiring any welding or brazing apparatus. The process of this invention employs a mouthpiece body and a nipple which are prepared separately from each other. The mouthpiece body has a nipple holding hole, and a seat surface encircling one end of the hole, while another seat surface defining a seat for a hose is provided around the other end of the hole. The nipple has a radially outwardly spread end. The nipple is inserted into the nipple holding hole until its spread end abuts on the seat surface around one end of the hole, while the other end of the nipple projects outwardly from the other end of the hole. The spread end of the nipple is pressed against the seat surface around one end of the hole until it becomes flush with the seat surface, while the seat surface around the other end of the hole is caulked (i.e. mechanically crimped) about the nipple, whereby the nipple is secured to the mouthpiece body.

DESCRIPTION OF THE PREFERRED EMBODIMENT

Figure 1:
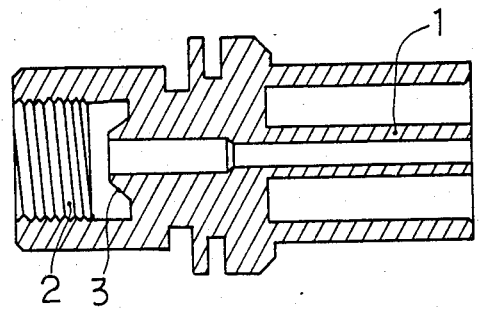
FIG. 1 is a longitudinal sectional view of a conventional hose mouthpiece.
Figure 2:
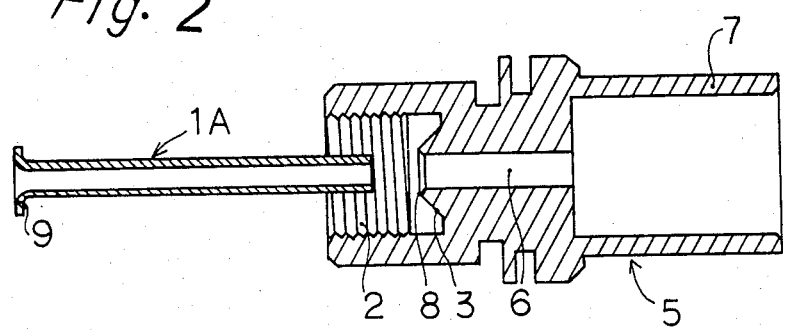
FIG. 2 is a longitudinal sectional view of the nipple and the mouthpiece body which are going to be joined to each other in accordance with the process of this invention.

The process of this invention employs a nipple 1A and a mouthpiece body 5 which are prepared separately from each other as shown in FIG. 2. The mouthpiece body 5 is prepared from a steel bar or the like by cutting, and has a female screw thread 2, a seat surface 3, a nipple holding hole 6 and a sleeve 7. One end of the hole 6 has a chamfered edge 8 which is encircled by the seat surface 3. The nipple 1A is prepared from a steel tube or the like having a predetermined length. The nipple 1A has a radially outwardly spread end 9 which may be obtained by pressing, and which is perpendicular to the longitudinal axis of the nipple 1A. If desired, it is possible to use a nipple having a fir-tree end which may be prepared by rolling or cutting.

Figure 3:
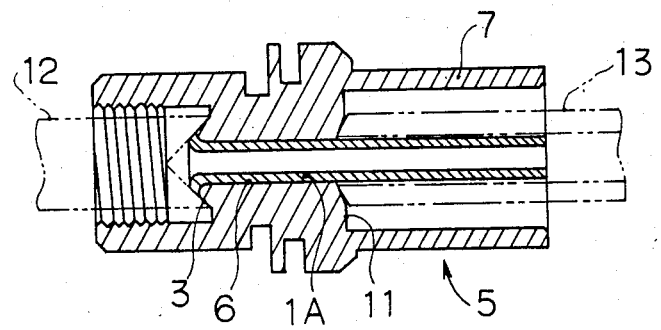
FIG. 3 is a longitudinal sectional view of a hose mouthpiece obtained by the process of this invention.

The nipple 1A is inserted into the nipple holding hole 6 in the mouthpiece body 5 through one end thereof encircled by the seat surface 3 until its spread end 9 abuts on the seat surface 3, while the other end of the nipple 1A projects outwardly from the other end of the hole 6. The spread end 9 is press formed so that it may become flush with the seat surface 3. Another seat surface 11 encircles the other end of the hole 6 to define a seat for one end of a hose. The seat surface 11 is caulked about the nipple 1A, whereby the nipple 1A is secured to the mouthpiece body 5. The press-forming job may be achieved by a punch 12, and the caulking job also by a punch 13, as shown in FIG. 3. Thus, the nipple 1A is tightly joined to the mouthpiece body 5 at both ends of the hole 6, and a tight seal is obtained between the nipple 1A and the mouthpiece body 5. The chamfered edge 8 facilitates the fitting of the spread end 9 to the seat surface 3. The simultaneous performance of the press-forming and caulking jobs is preferable for reducing the time and labor which they require, though they can, of course, be performed separately.

A hose may be connected to the mouthpiece in a customary manner, i.e., one end of the hose is inserted into an annular space between the nipple 1A and the sleeve 7, and the sleeve 7 is caulked about the hose.

What is claimed is:

1. In a process for manufacturing a hose mouthpiece by joining a nipple, made of hard but somewhat elastic deformable material such as steel, to a mouthpiece body made of a similar material having a nipple holding hole, the improvement which comprises:

inserting said nipple having a radially outwardly spread end into said hole at one end thereof around which an externally frusto-conical first seat surface having a chamfered inner edge is formed on said body, until said spread end abuts on said seat surface, while the other end of said nipple projects outwardly from the other end of said hole;

press forming said spread end so that it may become flush with said seat surface; and crimping a second seat surface about said nipple, said second seat surface being provided on said body and encircling said other end of said hole to define a seat for one end of a hose, whereby said nipple is secured to said body.

2. A process as set forth in claim 1, wherein said press forming and said crimping are performed simultaneously.

* * * * *